Figure 1:
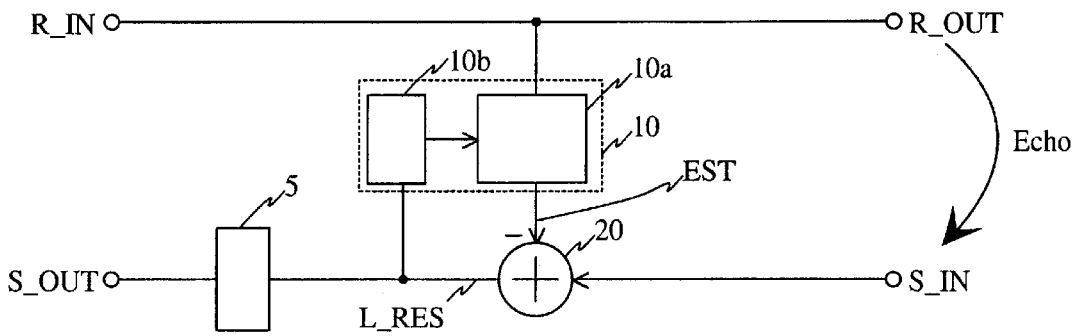

United States Patent [19]
Mäkinen et al.

[11] Patent Number: 6,163,609
[45] Date of Patent: Dec. 19, 2000

[54] SYSTEM AND METHOD FOR ECHO CANCELLING AND MOBILE COMMUNICATIONS DEVICE

[75] Inventors: Jorma Mäkinen; Antti Vähätalo, both of Tampere, Finland

[73] Assignee: Nokia Telecommunications Oy, Helsinki, Finland

[21] Appl. No.: 09/061,623

[22] Filed: Apr. 16, 1998

[30] Foreign Application Priority Data

Apr. 18, 1997 [FI] Finland ................................. 971664

[51] Int. Cl.$^7$ .................................................. H04M 9/00
[52] U.S. Cl. ............................................ 379/410; 379/406
[58] Field of Search ................................. 379/406–407, 379/410–412, 388–390; 370/286, 289–290

[56] References Cited

U.S. PATENT DOCUMENTS 5,715,310  2/1998  Hagqvist ................................. 379/406

FOREIGN PATENT DOCUMENTS

| 0 627 840 A2 | 12/1994 | European Pat. Off. . |
| 0 760 575 A2 | 3/1997 | European Pat. Off. . |
| 2 164 529 | 3/1986 | United Kingdom . |
| 2 164 828 | 3/1986 | United Kingdom . |
| WO 94/08418 | 4/1994 | WIPO . |
| WO 97/15124 | 4/1997 | WIPO . |

OTHER PUBLICATIONS

"Echo Canceler with Two Echo Path Models", Kazuo Ochiai, Takashi Araseki, and Takashi Ogihara, IEEE Transactions on Communications, vol. Com–25, No. 6, pp. 589–594, Jun. 1977.

"Implementation and Evaluation of an Acoustic Echo Canceller using the Duo–Filter Control System", Yoichi Hanada, Shoji Makino, Junji Kojima and Suchiro Shimauchi, International Workshop on Acoustic Echo and Noise Control, pp. 79–82, Jun. 1995.

Finnish Search Report.

*Primary Examiner*—Curtis A. Kuntz
*Assistant Examiner*—George Eng
*Attorney, Agent, or Firm*—Perman & Green, LLP

[57] ABSTRACT

The invention relates to echo cancelling methods used in telephone systems, more specifically to echo cancelling methods based on two filters. The echo cancelling method according to the invention employs two adaptive filters, namely, a main filter (10) and a background filter (50). The purpose of the background filter (50) is to make sure that the main filter (10) model stays correct. The main and background filter coefficients are updated on different conditions, and the residual signals (L_RES1, L_RES2) produced by the filters are compared to each other. The set of filter coefficients used for generating the echo canceller's output signal (S_OUT) is selected on the basis of said comparison of the residual signals. The selection of the set of filter coefficients is carried out either by copying the background filter coefficients to the main filter or by interchanging the background and main filter functions. Operation of the echo canceller in a double talk situation is enhanced by comparing the residual signals produced by the two filters frequency band by frequency band, thus avoiding errors caused by echo-resembling correlations caused by random loud sounds in double talk situations.

9 Claims, 5 Drawing Sheets

SYSTEM AND METHOD FOR ECHO CANCELLING AND MOBILE COMMUNICATIONS DEVICE

The invention relates to echo cancelling methods used in telephone systems, in particular to echo cancelling methods based on two filters.

There are several factors contributing to the occurrence of echo in a telephone network. Impedance mismatching causes electric echo in 2/4-wire circuits, or hybrid circuits, in the telephone network. Acoustic echo occurs in telephone apparatuses when sound loops back from the loudspeaker to the microphone. For example, acoustic echo may occur in a hands-free phone as the sound coming from the loudspeaker is reflected back to the microphone via the walls of the room. Acoustic echo may also occur when an acoustic signal travels via the structures of the handset of an ordinary phone, or via the body structures of a mobile phone, for instance. In mobile communications systems echo cancelling is used in mobile switching centres to eliminate electric and acoustic echo possibly coming from the wired network, and in a mobile communications device to eliminate acoustic echo occurring in the mobile communications device.

Echo cancellers are typically implemented using an adaptive filter. FIG. 1 is a block diagram illustrating the structure of a typical echo canceller realised using an adaptive filter. An adaptive filter 10 filters a far-end signal R_IN and, on the basis of said signal, generates an echo estimate signal EST which is subtracted in element 20 from the near-end speech signal S_IN. The adaptive filter is controlled by a residual signal L_RES so that the echo estimate signal EST generated by the adaptive filter cancels as accurately as possible the far-end signal echo occurring in signal S_IN. FIG. 1 also illustrates, by way of example, the structure of a typical adaptive filter. Such a filter 10 can be described by means of two functional blocks, namely, filter block 10a and coefficient calculation block 10b. The coefficient calculation block continuously calculates new values for the filter coefficients used by the filter block 10a.

An adaptive filter adapts to the characteristics of the echo path so that echo can be cancelled in the signal also when the echo path varies. Typically, an adaptive filter cannot completely eliminate the echo so that residual echo remains in the signal. The remaining echo can be muted by attenuating the residual signal of the echo canceller. Not only can the residual signal be attenuated but also noise, the characteristics of which correspond to the background noise in the S_IN signal, can be added to it. Typically the operation of the adaptive filter helps determine when the remaining signal has so much echo that the signal has to be attenuated. In the echo canceller depicted in FIG. 1, an attenuation block 5 takes care of the attenuation of the residual signal and possible addition of noise.

Adaptive filters in echo cancellers are usually implemented using the least mean square (LMS) algorithm. Coefficients of the filter are typically updated only when the received signal includes far-end talk and the outgoing speech signal includes far-end signal echo. If the outgoing speech signal includes, in addition to echo, also near-end talk, there occurs a double-talk situation. In such a situation, the updating of the filter coefficients has to be prevented because the near-end talk would cause the filter model to deteriorate.

Figure 2:
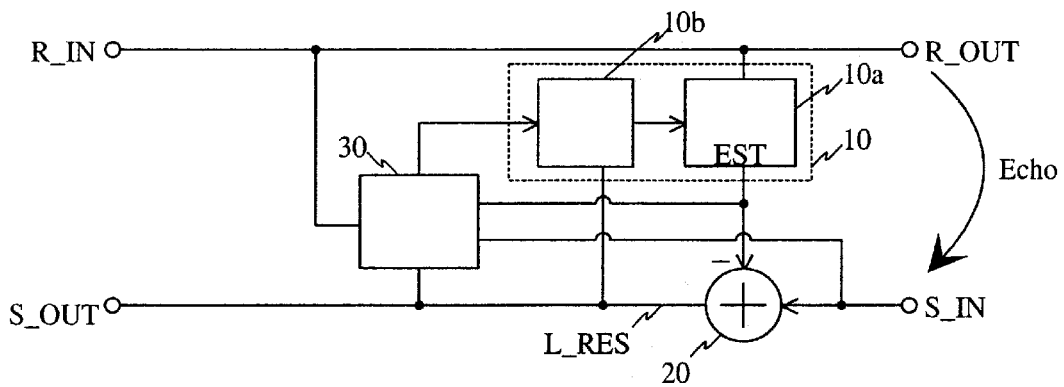

There are several known algorithms for controlling filter update. These algorithms typically control filter update on the basis of signals R_IN, S_IN, L_RES and EST. Such an echo canceller can be described using a block diagram such as the one shown in FIG. 2, for example. The structure is otherwise identical to that shown in FIG. 1, but it additionally has a control element 30 for controlling the update of the adaptive filter 10 on the basis of signals R_IN, S_IN, L_RES and EST. In such a structure, the control element 30 may send to the filter 10 a signal which causes the coefficient calculation block 10b to stop the calculation of coefficients. These methods, however, have a problem dealing with a situation in which the echo quickly becomes stronger. Then the stronger echo is typically interpreted as a near-end talk signal, i.e. the situation is interpreted as double talk and the filter coefficients are not updated and the echo gets through the filter unattenuated at least for a period of time. Such an error can be corrected e.g. by raising the threshold at which the coefficient update is prevented. Such a correction, however, has the problem that a double talk situation can be left unnoticed, in which case the filter model would deteriorate.

Attempts have been made to correct the problems described above by using two adaptive filters, i.e. by means of a two echo paths model. One such solution is disclosed in the article "Echo Canceler with Two Echo Path Models" by Kazuo Ochiai, Takashi Araseki, Takashi Ogihara, 16 Transactions on Communications, Vol. COM-25, No. 6, June 1977. The method in question employs two filters, namely, a background filter ("background echo model") and main filter ("foreground echo model"). Coefficients of the background filter are updated as described above and the residual echo of the background filter is compared to the residual echo of the main filter. Coefficients of the main filter are not separately updated but when certain conditions are met, the coefficients are copied from the background filter to the main filter. The signal filtered by the main filter is the output signal of the echo canceller. In this arrangement the problem is that the update is always directed to the background filter. Superiority of the background filter model can only be found out after comparing its post-update residual echo to the main filter's residual echo so that the main filter's coefficients are changed only after a certain delay.

A similar solution is described in the article "Implementation and Evaluation of an Acoustic Echo Canceller using the Duo-Filter Control System" by Yoichi Haneda, Shoji Makino, Junji Kojima, Suehiro Shimauchi, International Workshop on Acoustic Echo and Noise Control, Rønos, Norway, June 1995. This article, too, discloses a structure implemented using two adaptive filters wherein only one of the filters is updated.

Application document EP 0 627 840 discloses another method using two adaptive filters. It differs from the dual-adaptive-filter methods described above in that the filter coefficients are not copied but the coefficients of both filters are updated. The background filter is updated always when talk is detected in the far-end signal. A double talk detector compares the residual echoes of the main and background filters and controls the main filter update on the basis of said residual echoes. The disadvantage of this solution is that it requires a lot of computing power. Calculation of the model represented by the filter coefficients requires a relatively great amount of computing capacity, and in the solution disclosed by the application document EP 0 627 840 the models of the both filters may be calculated and updated simultaneously.

To save computing capacity the application document EP 0 627 840 describes an arrangement in which the background filter only filters a low-pass filtered frequency band below a certain frequency so that the background filter's sampling rate can be decreased whereby the need for computing capacity is reduced. However, this solution has the disadvantage that the limitation of the band of one of the filters affects the reliability of the filter output comparison. In the arrangement disclosed in said document, the background filter does not at all take into account the signal part above said certain frequency so that the background filter model does not correspond to the echo path characteristics as far as this signal band is concerned. Furthermore, the background filter does not respond at all if there is a signal, such as a high-frequency tone, only in the band above said certain frequency.

An object of the invention is to provide an echo canceller which preserves the echo path model as well as possible during double talk. A further object of the invention is to provide an echo canceller which responds to echo path changes more quickly than devices of the prior art.

The objects are achieved by using two adaptive filters, one of which serves as a main filter and the other as a background filter, and by choosing the set of filter coefficients used in the output signal filtering according to the filter that has the lower residual signal level. The residual signals are advantageously compared by dividing them into at least two frequency bands and comparing the divided frequency bands with each other.

The echo cancelling system according to the invention is characterised in that which is stated in the independent claim directed to an echo cancelling system. The invention is also directed to a method which is characterised in that which is stated in the independent clalim directed to a method. The invention is further directed to a mobile communications device which is characterised in that which is stated in the independent claim directed to a mobile communications device. The independent claims describe further advantageous embodiments of the invention.

The echo canceller according to the invention employs two adaptive filters, namely, a main filter and a background filter. The purpose of the background filter is to make sure the main filter model stays correct. The coefficients of the main and background filter are updated on different conditions and the residual signals produced by the filters are compared with each other. The set of filter coefficients used in the generation of the echo canceller's output signal is selected on the basis of this comparison of the residual signals. The selection of the set of filter coefficients is carried out either by copying the background filter's coefficients to the main filter or by interchanging the main and background filter functions. Operation of the echo canceller in a double talk situation is enhanced by comparing the residual signals produced by the two filters frequency band by frequency band, thus avoiding errors caused by echo-resembling correlations caused by random loud sounds in double talk situations.

Figure 3:
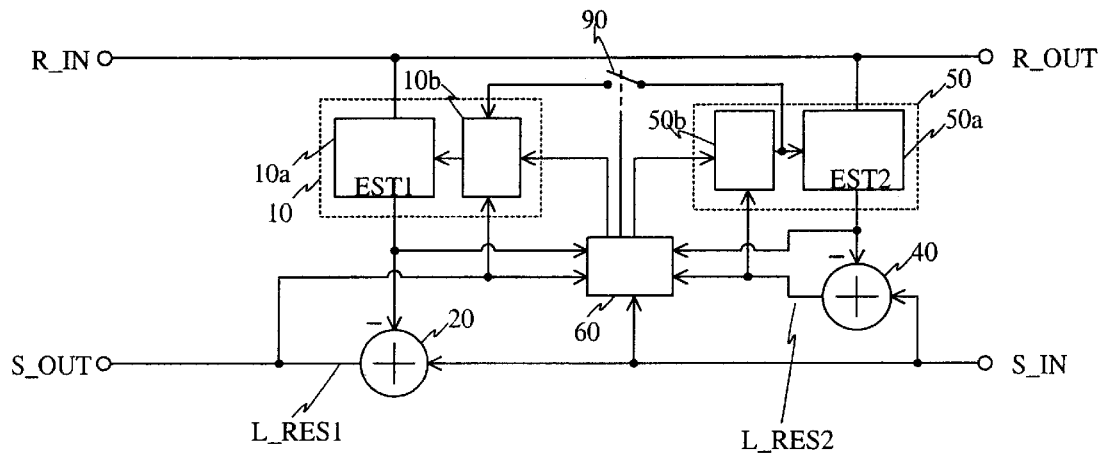
Figure 4:
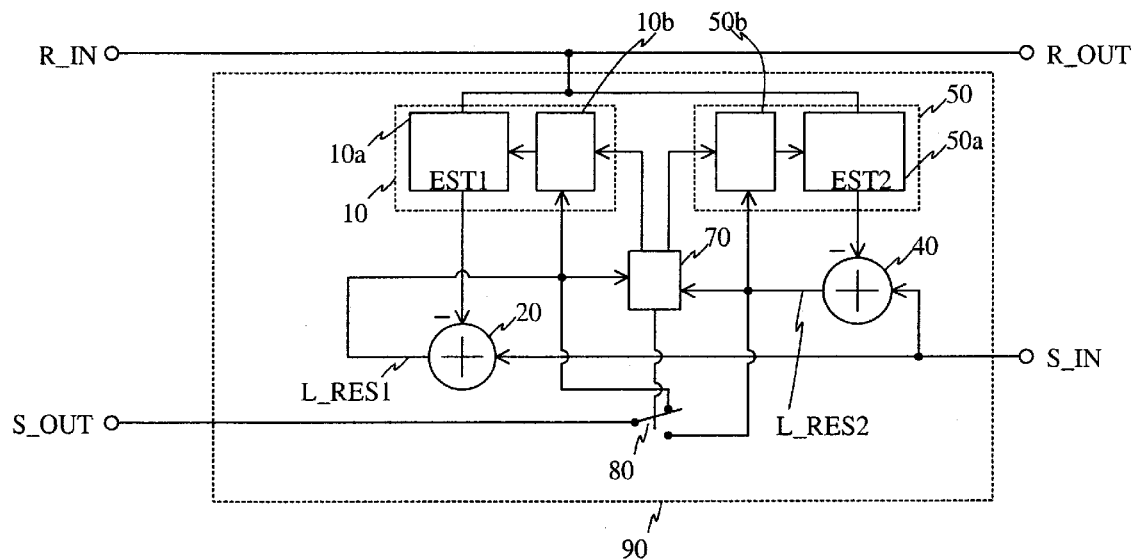
Figure 5:
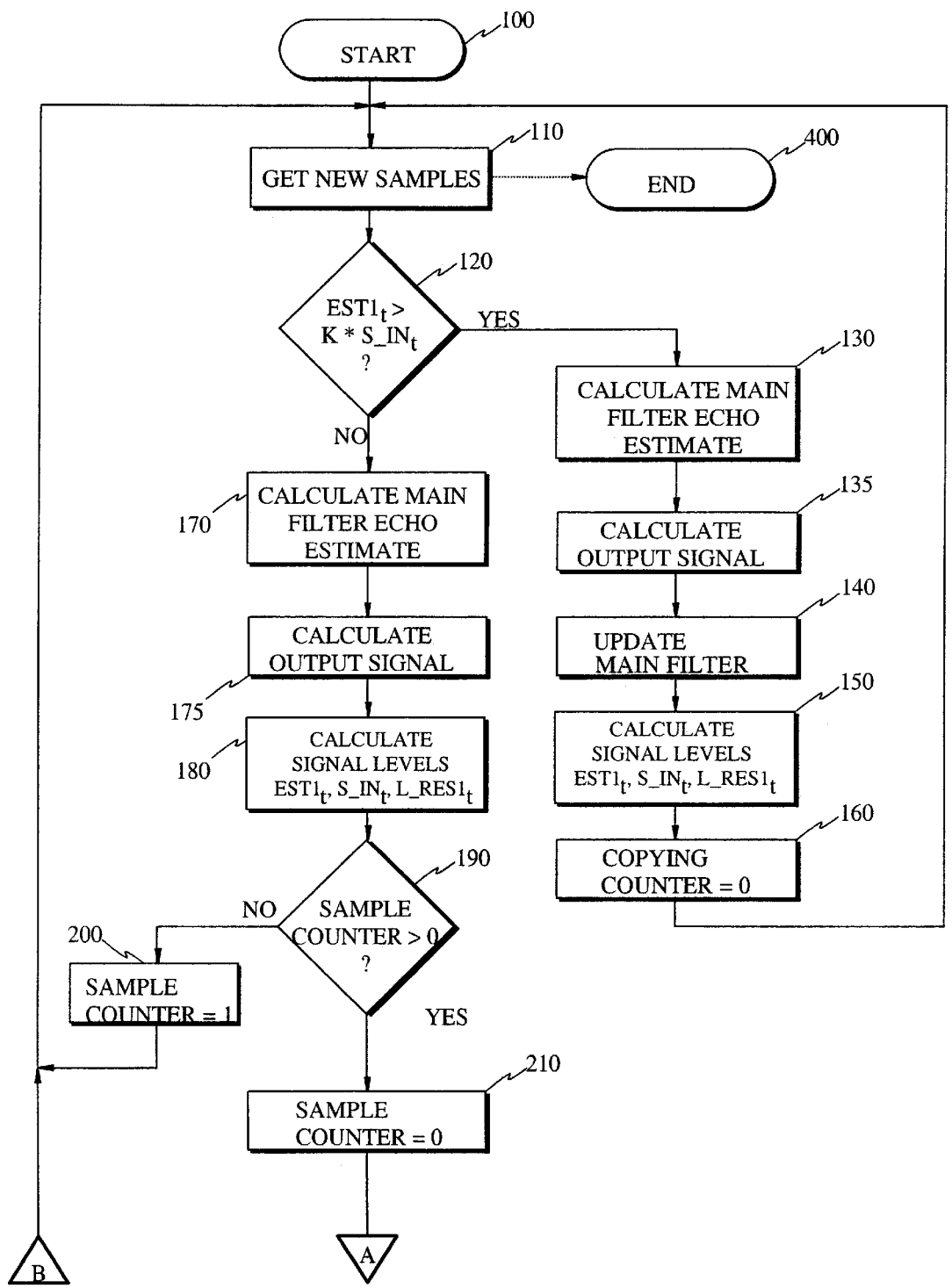
Figure 6:
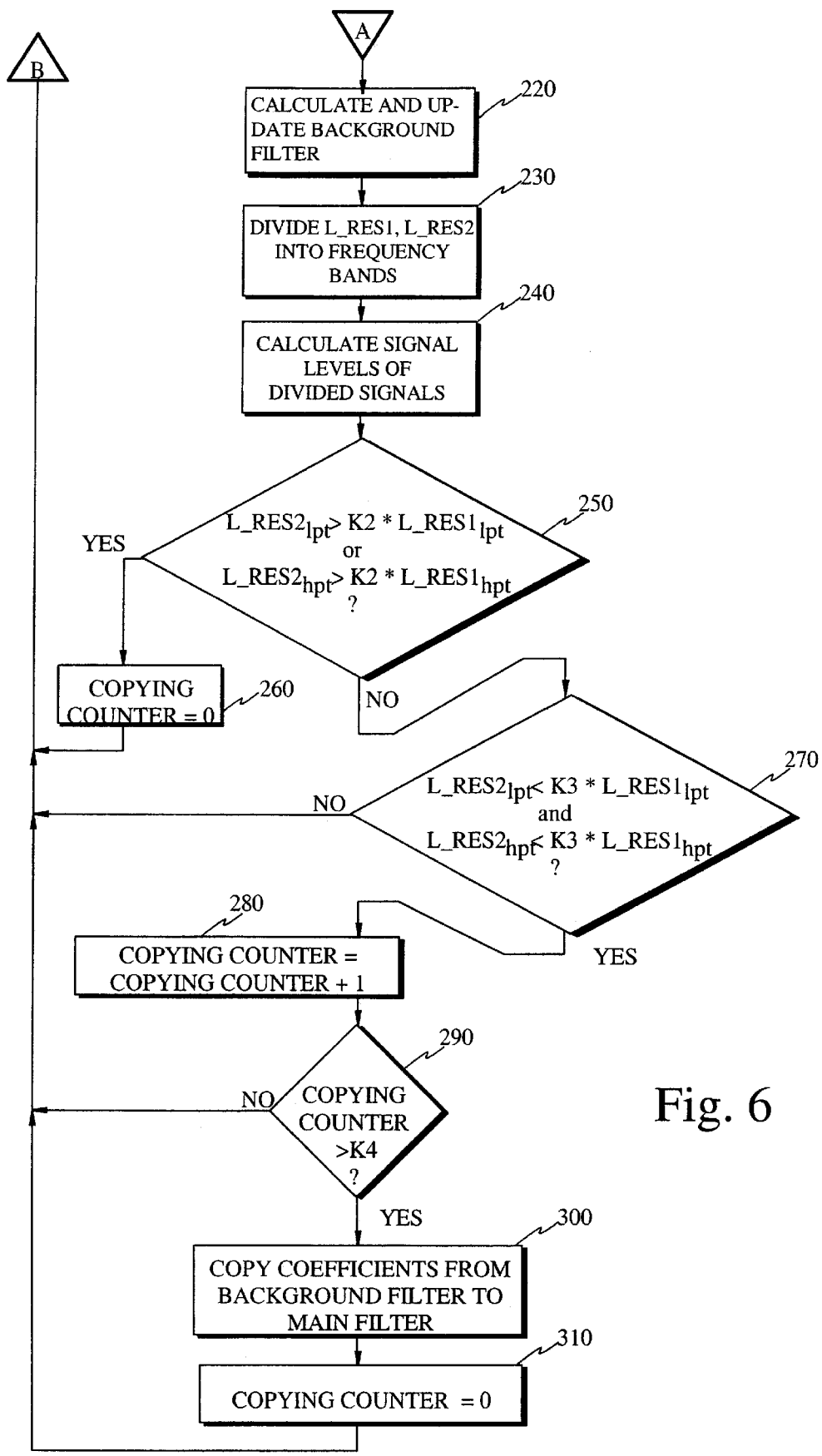
Figure 7:
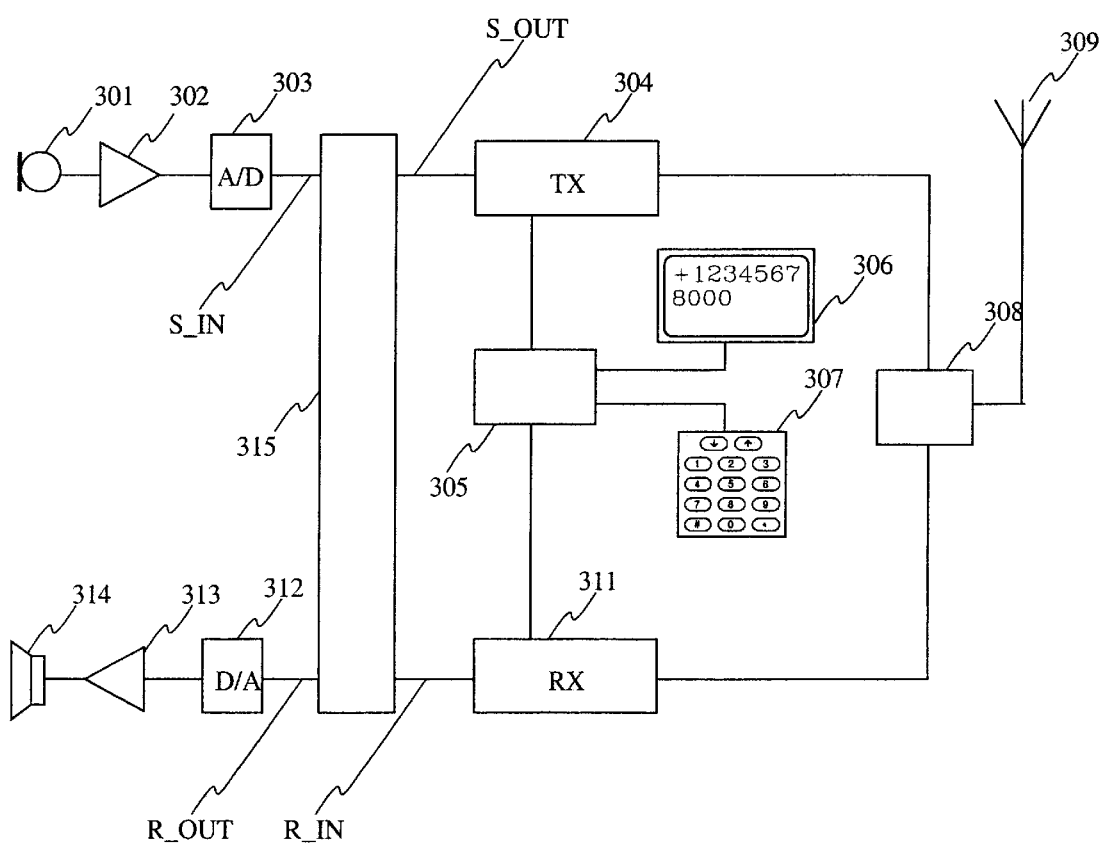

The invention is described in more detail with reference to the preferred embodiments presented by way of example and to the attached drawing in which FIG. 1 shows an echo canceller according to the prior art described above comprising one adaptive filter, FIG. 2 shows a second echo canceller according to the prior art described above comprising one adaptive filter, FIG. 3 shows the structure of a preferred embodiment of the invention, FIG. 4 shows the structure of a preferred embodiment of the invention, FIG. 5 shows the first part of the functional block diagram of a preferred embodiment of the invention, FIG. 6 shows the end part of the block diagram shown in FIG. 5, and FIG. 7 shows the block diagram of a preferred application of the invention.

In this application, names S_IN, S_OUT, R_IN, R_OUT, EST1 and EST2 refer to certain signals even though, for clarity, the same names in parts of the drawing refer to the interfaces corresponding to the signals in question.

FIG. 3 shows by way of example the structure of a preferred embodiment of the invention. The echo canceller according to the invention employs two adaptive filters 10, 50 which in this application are called a main filter 10 and a background filter 50. The background filter is used to make sure that the main filter model is correct. The background filter echo estimate EST2 is subtracted from signal S_IN, thus producing a background filter residual signal L_RES2. Similarly, the main filter echo estimate EST1 is subtracted from signal S_IN, producing a main filter residual signal L_RES1. The signals L_RES1 and L_RES2 are taken to a control element 60 that controls the main filter 10 and background filter 50 by interrupting their update when necessary. The control element 60 controls the main and background filters also on the basis of the echo estimates EST1 and EST2 and the input signal S_IN. If necessary, the control element 60 may also direct the background filter coefficients to be copied to the main filter, which is represented by switch 90 in FIG. 3.

Below, the operation of the echo canceller according to the invention is described on a general level. The coefficients of the main filter 10 are updated when the level of the main filter echo estimate EST1 is high enough, compared to the level of signal S_IN. If the main filter echo estimate level is not high enough, there is a double talk situation or the strength of the echo is low compared to noise, and in both of these situations the updating of the main filter coefficients would deteriorate the main filter echo path model. In such a situation, the coefficients of the background filter 50 are updated in case the echo strength was increased along the signal path, whereby the main filter update is prevented because the main filter echo estimate level has dropped with respect to the S_IN signal level.

The background filter coefficients are updated advantageously when the main filter is not updated. The background filter coefficients are copied to the main filter on the basis of the comparison of the residual signals L_RES 1 and L_RES2. If the level of the L_RES2 signal stays for a predetermined period of time, and to a predetermined extent, lower than the level of the L_RES 1 signal, the background filter coefficients are copied to the main filter. Since the echo path attenuation may be high and a weak echo signal may also be mixed with near-end background noise, the level difference required must be relatively small. In addition, the time required has to be relatively short for the echo canceller to respond to echo path changes quickly enough.

In some double talk situations the background filter may attenuate a narrow frequency band in the near-end speech signal in the S_IN signal. For example, a strong frequency component of a voiced sound occurring in the S_IN signal during a voiced sound in near-end speech may incidentally momentarily correlate with the far-end speech. Such a correlation may cause a situation wherein the level of the residual signal L_RES2 of the background filter is lower than the level of the residual signal L_RES1 of the main filter, which, in turn, may result in the copying of the background filter coefficients to the main filter. In such a double talk situation the background filter model does not correspond to the actual echo path situation, which means that also the main filter model would be distorted. Such an error can be avoided by dividing the signals L_RES1 and L_RES2 into at least two frequency bands and comparing the levels of these signals frequency band by frequency band, and by making the copying of the background filter coefficients to the main filter happen only if the levels of all frequency bands of signal L_RES2 are lower than the levels of the corresponding frequency bands of signal L_RES1.

Above it was described embodiments of the invention wherein the background filter coefficients are copied to the main filter if it is detected that the background filter coefficients yield a better result. In a preferred embodiment of the invention, the coefficients are not copied from a filter to another in such a situation, but the main and background filter functions are interchanged by changing the filter the residual signal of which is chosen as the echo canceller's output signal. FIG. 4 shows an example of the general structure of such an embodiment. In this embodiment, a comparison element 70 controls a switch 80 that selects the signal for the echo canceller's output S_OUT. In the example of FIG. 4, the comparison element 70 performs the signal selection on the basis of the comparison between the residual signals L_RES1 and L_RES2. In the echo canceller according to the invention the comparison element 70 may also use other signals in the echo canceller to control the signal selection. Depending on the embodiment in question it may be necessary in such a situation to alter the operation of the various elements of the embodiment in other ways, too. For example, in an embodiment realised using a signal processor wherein the main filter is given more computing time than the background filter also the time and computing resources reserved for the filters have to be interchanged.

The echo canceller according to the invention can also be realised such that it comprises two inputs and only one output. In the example of FIG. 4, such an implementation is represented by the structure 90 within the area limited by the dashed line. FIG. 4 shows that in this example the far-end signal is not processed in any way between the input R_IN and output R_OUT, so, regarding the operation in this example, the output R_OUT is not necessary and in an application of the echo canceller according to the invention the corresponding signal can be connected outside the echo canceller.

Below, the structure of a preferred embodiment of the invention is described in greater detail by means of mathematical representation of the filters. The main filter echo estimate can be calculated using e.g. the formula below:

$$EST1 = \sum_{i=1}^{N} h_1(i) \cdot x(i) \tag{1}$$

where EST1 is the main filter echo estimate, vector $h_1(i)$ contains the main filter coefficients, vector $x(i)$ contains stored previous samples of the input signal R_IN and N is the length of the filter. In vector $x(i)$ the latest sample is $x(1)$ and the oldest $x(N)$. Signal L_RES1 filtered by the main filter is obtained by subtracting the main filter echo estimate EST1 from the input signal S_IN:

$$L\_RES1 = S\_IN - EST1 \tag{2}$$

The main filter coefficients can be updated using e.g. the formula (3) below:

$$h_1(i) = h_1(i) + \mu \cdot L\_RES1 \cdot x(i)/p \tag{3}$$

where p is the power of the samples in the delay line. The formula (3) is repeated for each filter coefficient $h_1(i)$, where $i=[1,N]$. The formula (3) is based on a known normalised LMS algorithm. The power p of the samples in the delay line can be calculated using e.g. the formula below:

$$p = \sum_{i=1}^{N} x(i) \cdot x(i) \tag{4}$$

The background filter echo estimate can be calculated using e.g. the formula below which corresponds to formula (1):

$$EST2 = \sum_{i=1}^{N} h_2(i) \cdot x(i) \tag{5}$$

In the formula (5) $h_2(i)$ is a vector containing the background filter coefficients and EST2 is the echo estimate produced by the background filter. Similarly, the background filter coefficient values can be calculated using e.g. the formula (6) below:

$$h_2(i) = h_2(i) + \mu \cdot L\_RES2 \cdot x(i)/p \tag{6}$$

The formula (6) is repeated for each filter coefficient $h_2(i)$, where $i=[1,N]$. Signal L_RES2 filtered by the background filter is obtained by subtracting the background filter echo estimate EST2 from the input signal S_IN:

$$L\_RES2 = S\_IN - EST2 \tag{7}$$

The division of residual signals L_RES 1 and L_RES2 into two frequency bands can be done e.g. by using a so-called all-pass filter pair known to a person skilled in the art:

$$A_1(n) = a \cdot x(n) + x(n-1) - a \cdot A_2(n-1) \tag{8}$$

$$A_2(n) = b \cdot x(n) + c \cdot x(n-1) + x(n-2) - c \cdot A_2(n-1) - b \cdot A_2(n-2) \tag{9}$$

In formulas (8) and (9) coefficients a, b and c are the coefficients that determine the response of the filter pair, $x(n)$ is the filter input at moment n, and $A_1(n)$ and $A_2(n)$ are the output values of the filter pair at moment n. The lower frequency band $S_{lp}$ of the desired signal S is obtained from the above as follows:

$$S_{lp}(n) = (A_1(n) + A_2(n))/2 \tag{10}$$

The higher frequency band $S_{hp}$ is obtained using the formula (11) below:

$$S_{hp}(n) = (A_1(n) - A_2(n))/2 \tag{11}$$

Formulas (8), (9), (10) and (11) can be used to calculate the frequency bands $L\_RES1_{lp}$ and $L\_RES1_{hp}$ of the L_RES1 signal by substituting the signal value L_RES in formulas (8) and (9) for the filter input value $x(n)$, and, similarly, the frequency bands $L\_RES2_{lp}$ and $L\_RES2_{hp}$ of the L_RES2 signal by substituting the signal value L_RES2 in formulas (8) and (9) for the filter input value $x(n)$.

Normally it does not pay to compare the mutual strength relationships of the signals using individual samples because successive samples may vary a great deal. It is preferable to use averaged quantities in the comparison of signal strengths, e.g. signal levels calculated using the formula below:

$$S_t = \alpha \cdot S_t + (1-\alpha) \cdot abs(x(n)) \qquad (12)$$

where $\alpha$ is a suitable time constant, $S_t$ is a signal level counter for the signal S to be calculated, x(n) is a sample of the corresponding signal S at moment n and abs( ) is a function that calculates an absolute value. The value of coefficient $\alpha$ is advantageously 0.95, for example. In this application, $S_t$ refers in general to the value of the signal level counter for signal S, e.g. S_IN$_t$ refers to the value of the signal level counter for signal S_IN.

FIGS. 5 and 6 illustrate the operation of a preferred embodiment of the invention by means of a block diagram, referring to the mathematical formulas described above. The embodiment according to these figures can be realised particularly advantageously by means of a digital signal processor. The operation of echo cancelling can be started 100 e.g. when a new call is started. At the start 100 all signal level counters and filter coefficients are reset to predetermined initial values. At the next stage 110 it is fetched the next samples of the incoming signals R_IN and S_IN. The operation can be ended 400 e.g. if there are no new samples because the call has been terminated. Otherwise, when the samples have been fetched, the signal level EST1$_t$ of the main filter echo estimate EST1 is compared 120 to the S_IN signal's level S_IN$_t$ multiplied by coefficient K. The value of the constant coefficient K is advantageously 0.9, for example. If the signal level of the echo estimate is higher, the operation enters stage 130 to update the main filter coefficients.

At stages 130 and 135 it is calculated the main filter echo estimate and the next sample of signal L_RES1 according to formulas (1) and (2). After that, it is calculated 140 the new coefficients of the main filter according to formulas (3) and (4). At stage 150 it is calculated the new values of signal levels EST1$_t$, S_IN$_t$ and L_RES1$_t$ according to formula (12). At stage 160 the value of a special copying counter is reset to zero. Said copying counter is used in the embodiment illustrated by FIGS. 5 and 6 to control the operation. After stage 160 the operation returns to stage 110.

If it was detected at stage 120 that the main filter echo estimate signal level EST1$_t$ is not higher than said limit, the operation moves to stage 170 wherein it is calculated the main filter echo estimate whereafter it is calculated the next sample of signal L_RES1 according to formulas (1) and (2) at stage 175. At stage 180 it is calculated the new values of signal levels EST1$_t$, S_IN$_t$ and L_RES1$_t$ according to formula (12). At the following stage 190 it is examined the value of a special sample counter. In this embodiment the background filter values are calculated and its coefficients updated only at every second sample in order to reduce the load of the signal processor. The sample counter is used for controlling this calculation. At stage 190 it is checked whether the value of the sample counter is greater than zero. If the counter value is not greater than zero, the value of the sample counter is set to one at stage 200, whereafter the operation returns to stage 110. If the counter value is greater than zero, the value of the sample counter is set to zero at stage 210. So, the background filter calculation is carried out only for every second sample.

FIG. 6 shows the continuation of the block diagram shown in FIG. 5. After stage 210 the operation moves on to stage 220 wherein the background filter echo estimate and new values of the residual signal L_RES2 and background filter coefficients are calculated, and the coefficients of the background filter are updated. Next, the residual signals L_RES1 and L_RES2 are divided 230 into frequency bands L_RES1$_{lp}$, L_RES1$_{hp}$, L_RES2$_{lp}$ and L_RES2$_{hp}$ according to formulas (8), (9), (10) and (11). At stage 240, the signal levels of signals L_RES1$_{lp}$, L_RES1$_{hp}$, L_RES2$_{lp}$ and L_RES2$_{hp}$ are calculated according to formula (12).

At the next stage 250, the signals L_RES1 and L_RES2 are compared to each other frequency band by frequency band. If the signal level of at least one frequency band of signal L_RES2 is higher than the signal level of the corresponding frequency band of signal L_RES1 multiplied by a certain constant K2, the value of the copying counter is set to zero at stage 260 and the operation returns to stage 110. The value of the constant K2 is advantageously greater than 1, e.g. 2.

At the next stage 270, the signals L_RES1 and L_RES2 are again compared to each other frequency band by frequency band. If the signal levels L_RES2$_{lpt}$, and L_RES2$_{hpt}$ of the both frequency bands of the background filter residual signal L_RES2 are not lower than the signal levels L_RES1$_{lpt}$ and L_RES1$_{hpt}$ of the corresponding frequency bands of the main filter residual signal L_RES1 multiplied by a certain coefficient K3, the operation returns to stage 110. The value of the constant K3 is advantageously smaller than 1, e.g. 0.5. If the signal levels L_RES2$_{lpt}$ and L_RES2$_{hpt}$ are lower, the operation moves on to stage 280 where the value of the copying counter is incremented. At the next stage 290, the value of the copying counter is compared to a predetermined limit K4. The value of the constant K4 may be e.g. 160. If the limit was not exceeded, the operation returns to stage 110. If the value of the copying counter is greater than the limit K4, the background filter coefficients are copied 300 to the main filter and the copying counter is set 310 to zero, whereafter the operation returns to stage 110.

If the echo canceller according to the invention is implemented in the form of software using a digital signal processor or other microprocessor, the echo canceller can be realised in such a manner that the use of two filters does not increase the amount of required computation compared to continuous calculation and updating of one filter. As was disclosed above in connection with the description of FIGS. 5 and 6, the background filter can be calculated using only the computing capacity that is left free when the main filter is not updated. If, for example, the calculation of the filter echo estimate and, on the other hand, the calculation and update of filter coefficients take equally many processor clock cycles, half the clock cycles are left free when the main filter is not updated. The background filter echo estimate and coefficients can be calculated e.g. at every second signal sample, in which case all calculation of the background filter takes substantially as much computing capacity as the updating of the main filter.

The division of residual signals into two frequency bands, as described above, is an example of a preferred embodiment of the invention. In the echo canceller according to the invention the residual signals can also be divided into more than two frequency bands. One suitable dividing frequency in the embodiment in which the residual signals are divided into two frequency bands, is 1000 Hz, for instance, in which case the frequency bands are typically 0 to 1000 Hz and 1000 to 4000 Hz.

In connection with the description of FIGS. 5 and 6 it was mentioned as a feature in a preferred embodiment the decimation of the input signal of the background filter, or the calculation of the background filter only at every other sample. Picking only every second sample from a normal speech signal with a sampling frequency of 8000 samples per second and a frequency band of 0 to 4000 Hz causes the 2000-to-4000-Hz frequency band to be aliased to the 0-to-2000-Hz frequency band. When in such an embodiment a residual signal is divided into two bands using 1000 Hz as the dividing frequency, the higher 1000-to-2000-Hz band contains the residual signal of the 1000-to-3000-Hz band of the original signal and the lower 0-to-1000-Hz band contains the residual signal of the 0-to-1000-Hz and 3000-to-4000-Hz bands of the original signal. In the case of the background filter the folding of the signal causes no harm since the residual signal is only used for comparing the signal levels. Since, in spite of the decimation, the whole frequency band of the original signal affects the shape of the background filter model, the background filter parameters are shaped according to the echo characteristics of the whole frequency band so that the parameters can be copied from the background filter to the main filter, if necessary. In a preferred embodiment of the invention, the background filter can also be calculated less frequently than every other time. The echo canceller according to the invention can also be realised such that the background filter is calculated at every sample.

In the exemplary embodiments of the invention described above the echo canceller's output signal S_OUT is produced directly from the residual signal. However, the echo canceller according to the invention may also employ a prior-art attenuation block 5 so that the residual signal is attenuated and/or noise is added to it in order to generate the output signal S_OUT. The attenuation block 5 can also be realised as a functional block outside the echo canceller proper.

Above it was disclosed by way of example the use of the LMS algorithm in the method according to the invention. However, the invention is not limited to the use of the LMS algorithm, but the method according to the invention may also employ any other known algorithm.

The advantages of a prior-art system based on multiple filters are achieved by the method according to the invention using less computing capacity. In the system according to the invention the frequency band used by the background filter need not be limited to save computing capacity so that the background filter adapts to the echo path along the whole frequency band. Furthermore, filter comparison is more reliable and the background filter coefficients can be transferred to the main filter, if necessary. Computing capacity is also saved as the background filter is not calculated during the main filter update.

In the solution according to the invention the signal level and time thresholds used in the comparison of the main and background filters can be kept lower than in the prior art because, thanks to the residual signal comparison frequency band by frequency band, the solution according to the invention operates reliably also in a double talk situation despite the low signal level and time thresholds. Thus, the solution according to the invention adapts faster than prior-art solutions to echo path changes and, in addition, a weak echo signal also causes adaptation.

FIG. 7 shows a block diagram of an advantageous application of the invention, namely, a mobile communications device comprising an echo canceller 315 according to the invention. The mobile communications device comprises parts that are typical of it, such as a microphone 301, keypad 307, display 306, earphone 314, transmit/receive switch 308, antenna 309, and a control unit 305. Additionally, the figure shows transmission 304 and reception 311 blocks typical of a mobile communications device. The transmission block 304 comprises functions needed in speech encoding, channel encoding, scrambling and modulation as well as the RF functions. The reception block 311 comprises the corresponding RF functions as well as the functions needed in demodulation, descrambling, channel decoding and speech decoding. A signal coming from the microphone 301, amplified in an amplifier stage 302 and converted to digital form in an A/D converter, provides the input signal S_IN for the echo canceller 315. The output signal S_OUT of the echo canceller 315 is taken to the transmitter block 304, typically to a speech encoding element in the transmitter block. In the receive branch, the echo canceller gets the input signal R_IN from the output of the receiver block 311, typically from a speech decoding element in the receiver block. The echo canceller's output signal R_OUT is converted to analog form by a D/A converter 312 and amplified in an amplifier stage 313 prior to being taken to the earphone 314. In this kind of an embodiment, the echo canceller 315 according to the invention can be typically realised using a digital signal processor such that the echo canceller 315 comprises said signal processor and the necessary memory and control circuits.

The echo cancelling method and system can also be used for echo cancelling in a telecommunications network, for example. In the case of the GSM system, for instance, the echo canceller may be located in a base station (BTS), base station controller (BSC) or in a mobile switching centre (MSC), depending on the implementation of the network. The signals R_IN, R_OUT, S_IN and S_OUT mentioned in this application correspond to the respective signals of respective up and down links in the telecommunications network.

It is obvious to one skilled in the art that different embodiments and applications of the invention are not limited to the examples described here but may vary within the scope defined by the claims set forth below.

In the claims below, the term functional parameter refers to the set of coefficients that determines the filtering characteristics of the adaptive filter 10, 50.

What is claimed is:

1. An echo cancelling system for removing the echo of a first signal from a second signal, said system having
   a first input for inputting the first signal,
   a second input for inputting the second signal
   an output for outputting a processed signal;
   a first adaptive filter for producing a first echo estimate, said first adaptive filter having a first functional parameter and being arranged to produce said first echo estimate from a signal found at the first input substantially on the basis of said first functional parameter;
   a first subtracting element for subtracting the first echo estimate from a signal found at the second input to produce a first residual signal;
   a second adaptive filter for producing a second echo estimate, said second adaptive filter having a second functional parameter and being arranged to produce said second echo estimate from a signal found at said first input substantially on the basis of said second functional parameter;
   a second subtracting element for subtracting the second echo estimate from a signal found at the second input to produce a second residual signal;
and which echo cancelling system is arranged to remove at least part of the echo of the first signal from the signal found at the second input and produces at the output a corresponding processed signal in which at least part of the echo of the first signal has been removed, and further comprises:

a comparison element to compare at least the first residual signal and the second residual signal, and is arranged to choose the functional parameter used in the generation of the processed signal found at the output from the first and second functional parameters on the basis of the output signal of said comparison element, a first frequency band dividing element which is arranged to divide the first residual signal into at least two frequency bands, and a second frequency band dividing element which is arranged to divide the second residual signal into at least two frequency bands, and said comparison element is arranged to compare the first and second residual signals by comparing said at least two frequency bands of the first residual signal to the corresponding said at least two frequency bands of the second residual signal.

2. The echo cancelling system of claim 1, characterised in that it is arranged to replace the first functional parameter with the second functional parameter in response to a change in the output signal of said comparison element, which change requires such replacement.

3. The echo cancelling system of claim 1, characterised in that it is arranged to select a processed signal to be outputted via the output from the first and second residual signals on the basis of the output signal of said comparison element.

4. An echo cancelling method for producing a processed second signal by removing from a second signal at least a part of the echo of a first signal, the steps of said method comprising:

using a first adaptive filter to produce a first echo estimate from the first signal on the basis of a first functional parameter, and a second adaptive filter to produce a second echo estimate from the first signal on the basis of a second functional parameter; and forming a first residual signal by subtracting the first echo estimate from the second signal and a second residual signal by subtracting the second echo estimate from the second signal;

and wherein the functional parameter used in the generation of said processed second signal is selected from the first and second functional parameters on the basis of a comparison of the levels of at least the first and second residual signals; and said first residual signal and second residual signal are both divided into at least two frequency bands and said first and second residual signals are compared by comparing their respective frequency bands.

5. The echo cancelling method of claim 4, characterised in that the processed second signal is produced by selecting, on the basis of said comparison, either the first residual signal or the second residual signal as the processed second signal.

6. The echo cancelling method of claim 4, characterised in that the processed second signal is produced substantially on the basis of the first echo estimate produced by the first adaptive filter and the first residual signal produced using the first echo estimate; and in that according to the result of said comparison either the value of the first functional parameter is replaced by the value of the second functional parameter, whereafter the first echo estimate is produced on the basis of the first functional parameter altered this way, or the value of the first functional parameter is not changed, whereafter the first echo estimate is produced on the basis of the unchanged first functional parameter.

7. A mobile communications device comprising an echo cancelling system to remove the echo of a first signal from a second signal, the echo cancelling system having a first input for inputting the first signal, a second input for inputting the second signal an output for outputting a processed signal;

a first adaptive filter for producing a first echo estimate, said first adaptive filter having a first functional parameter and being arranged to produce said first echo estimate from a signal found at the first input substantially on the basis of said first functional parameter;

a first subtracting element for subtracting the first echo estimate from a signal found at the second input to produce a first residual signal;

a second adaptive filter for producing a second echo estimate, said second adaptive filter having a second functional parameter and being arranged to produce said second echo estimate from a signal found at said first input substantially on the basis of said second functional parameter;

a second subtracting element for subtracting the second echo estimate from a signal found at the second input to produce a second residual signal;

and which echo cancelling system is arranged to remove at least part of the echo of the first signal from the signal found at the second input and produces at the output a corresponding processed signal in which at least part of the echo of the first signal has been removed, and further comprises:

a comparison element to compare at least the first residual signal and the second residual signal, and is arranged to choose the functional parameter used in the generation of the processed signal found at the output from the first and second functional parameters on the basis of the output signal of said comparison element, a first frequency band dividing element which is arranged to divide the first residual signal into at least two frequency bands, and a second frequency band dividing element which is arranged to divide the second residual signal into at least two frequency bands, and said comparison element is arranged to compare the first and second residual signals by comparing said at least two frequency bands of the first residual signal to the corresponding said at least two frequency bands of the second residual signal.

8. An echo cancelling system for removing at least a part of the echo of a first signal from a second signal and for producing a processed signal in which at least a part of the echo of the first signal has been removed, said system having a first input for inputting the first signal, a second input for inputting the second signal an output for outputting the processed signal;

a first adaptive filter for producing a first echo estimate substantially on the basis of a first functional parameter from a signal found at the first input;

a first subtracting element for subtracting the first echo estimate from a signal found at the second input to produce a first residual signal;

a second adaptive filter for producing a second echo estimate substantially on the basis of a second functional parameter from a signal found at said first input;

a second subtracting element for subtracting the second echo estimate from a signal found at the second input to produce a second residual signal;

comprising a first frequency band dividing element for dividing the first residual signal into at least two frequency bands, a second frequency band dividing element for dividing the second residual signal into at least two frequency bands, a comparison element for comparing at least the first residual signal and the second residual signal by comparing corresponding frequency bands of said at least two frequency bands of the signals and for selecting, from the first and second functional parameters, the functional parameter used in the generation of the processed signal on the basis of the output signal of said comparison element.

9. An echo cancelling method for producing a processed second signal by removing from a second signal at least a part of the echo of a first signal, said method having steps in which a first echo estimate is produced from the first signal on the basis of a first functional parameter using a first adaptive filter, a second echo estimate is produced from the first signal on the basis of a second functional parameter using a second adaptive filter, a first residual signal is formed by subtracting the first echo estimate from the second signal, a second residual signal is formed by subtracting the second echo estimate from the second signal; wherein the functional parameter used in the generation of said processed second signal is selected from the first and second functional parameters on the basis of a comparison of the levels of at least the first and second residual signals; and said comparison has at least the steps of dividing each of the at least the first and second residual signals into at least two frequency bands, comparing at least the first and second residual signals by comparing corresponding frequency bands of said at least two frequency bands of at least the first and second residual signals.

* * * * *